United States Patent
Teschner et al.

(10) Patent No.: US 7,836,705 B2
(45) Date of Patent: Nov. 23, 2010

(54) ROOF WITH INTERGRATED DEVICE FOR VENTILATING AND COOLING A MOTOR VEHICLE PASSENGER COMPARTMENT

(75) Inventors: Helmut Teschner, Landsberg (DE); Michael Koelbl, Neuried (DE); Martin Pollak, Puchheim (DE); Sven Vilsmayer, Krailling (DE); Rupert Kogler, Graefelfing (DE); Werner Paetz, Hofstetten (DE); Alfred Renner, Inning (DE); Gerit Erbeck, Niederneuching (DE); Hubert Boehm, Greifenberg (DE); Steffen Lorenz, Dachau (DE)

(73) Assignee: Webasto AG, Stockdorf (DE)

( * ) Notice: Subject to any disclaimer, the term of this patent is extended or adjusted under 35 U.S.C. 154(b) by 649 days.

(21) Appl. No.: 10/598,761

(22) PCT Filed: Mar. 7, 2005

(86) PCT No.: PCT/EP2005/002377

§ 371 (c)(1),
(2), (4) Date: Sep. 11, 2006

(87) PCT Pub. No.: WO2005/087525

PCT Pub. Date: Sep. 22, 2005

(65) Prior Publication Data

US 2008/0264070 A1    Oct. 30, 2008

(30) Foreign Application Priority Data

Mar. 9, 2004 (DE) .................. 10 2004 011 783

(51) Int. Cl.
*F25B 21/02* (2006.01)
(52) U.S. Cl. ................... 62/3.61; 62/3.2; 62/239

(58) Field of Classification Search ............ 62/3.2, 62/3.6, 61, 239, 244
See application file for complete search history.

(56) References Cited

U.S. PATENT DOCUMENTS

| 3,738,621 A | * | 6/1973 | Anderson .................. 261/29 |
| 5,038,674 A | | 8/1991 | Merges |
| 5,248,278 A | | 9/1993 | Fuerst et al. |

(Continued)

FOREIGN PATENT DOCUMENTS

DE    4204785 A1    8/1993

(Continued)

*Primary Examiner*—Melvin Jones
(74) *Attorney, Agent, or Firm*—Roberts Mlotkowski Safran & Cole, P.C.; David S. Safran

(57) ABSTRACT

A device for ventilating and cooling the interior of a vehicle with at least one air guide channel (7) having air inlet openings (8) located in the rear of a solar cell equipped vehicle roof (5a, 5b), the air guide channel (7) being restricted to the rear area (3) of the vehicle roof (5a, 5b) and having at least one fan (15) for taking in outside air (10) and at least one cooling element (14) for cooling the air taken in. The bottom of the air guide channel (7) is formed by a first section (12) of a roof portion (5b) which extends from the vehicle rear toward the vehicle front (3, 1) and the top of the air guide channel (7) is formed by a second section (13) of a roof portion (5a) which extends from the vehicle front toward the vehicle rear (1, 3).

9 Claims, 2 Drawing Sheets

U.S. PATENT DOCUMENTS 5,672,101 A * 9/1997 Thomas ................ 454/136
6,662,572 B1 * 12/2003 Howard ................ 62/3.61

FOREIGN PATENT DOCUMENTS

| | | | |
|---|---|---|---|
| DE | 29618135 U1 | 1/1997 |
| EP | 1477393 A2 | 11/2004 |
| JP | 64-18716 A | 1/1989 |
| JP | 6-32122 U | 4/1994 |
| JP | 2002-178745 A | 6/2002 |
| JP | 2004-82948 A | 3/2004 |

* cited by examiner

ROOF WITH INTERGRATED DEVICE FOR VENTILATING AND COOLING A MOTOR VEHICLE PASSENGER COMPARTMENT

BACKGROUND OF THE INVENTION

1. Field of the Invention

The invention relates to a device for ventilating and cooling the interior of a vehicle with air inlet openings located in the rear of a solar cell-equipped vehicle roof and with at least one air guide channel connected to it.

2. Description of Related Art

Conventionally, the interior of a vehicle is reached by blowing the outside air surrounding the vehicle into its interior, the cooling of the heated interior being achieved by the temperature difference between the outside and the inside temperature and the cooling action of the air flow. Devices for this supply and withdrawal of air from the outside to the inside and vice versa are known according to German Patent DE 40 22 928 C1 and corresponding to U.S. Pat. No. 5,248,278 and also for the roof area of a motor vehicle. Such devices generally have a fan which is located in the region of the roof cutout which can be closed with a conventional sliding roof cover.

German Patent DE 39 38 259 C1 and corresponding to U.S. Pat. No. 5,038,674 disclose a motor vehicle with a pivotable roof cover, and when the roof cover is swung up, a fan is moved into the action position in an opening between the roof cover and a motor vehicle roof opening frame. This fan can be electrically operated with a solar module mounted on the roof. This arrangement for ventilation of the passenger compartment is likewise used to supply outside air by means of the fan into the interior of the passenger compartment in order to cool the interior of the passenger compartment solely by the supplied outside air. However, this outside air flow supply can, at most, achieve 50% cooling of the interior since the outside air—especially on hot days—contributes to cooling of the heated vehicle space only to a very limited degree due to strong heating.

Especially when using glass roofs which are optionally equipped with solar cells does greater heating of the interior of the passenger compartment occur directly underneath the glass roof, therefore in the top area of the passenger compartment interior. Thus, it is desirable to blow outside air predominantly into this upper passenger compartment interior region. German Patent Application DE 42 04 785 A1 discloses an arrangement for climate control of a vehicle interior which has a flat heat exchanger which extends beyond the entire length of the vehicle roof on the lower inside of the roof. Outside air drawn via entry grill located above the rear window into a cassette in which the heat exchanger is located via and is split into upper and lower air streams at each side of the heat exchanger, the upper air stream being ducted to the top edge of the front windscreen and the lower air stream being directed into the passenger compartment interior and to the side windows. These heat exchangers are limited in their cooling capacity depending on the temperature of the outside air. Moreover, these heat exchangers require cassettes which are located under the roof, thereby reducing the height of the passenger compartment interior. Furthermore, these heat exchangers, in combination with cassettes, are complex in their construction and costly to produce.

SUMMARY OF THE INVENTION

Accordingly, a primary object of this invention is to provide a device for ventilating and cooling the interior of a motor vehicle which, even at high outside temperatures, allows effective cooling of the vehicle interior, preferably in its upper region, which is simple in its structure and is economical to produce.

This object is achieved by the air guide channel, which has at least one fan for taking in outside air, being restricted to the rear area of the vehicle roof with the bottom of the air guide channel being formed by a first section of a roof portion which extends in a direction from the vehicle rear toward the vehicle front, and the top of the air guide channel being formed by a second section of a roof portion which extends in a direction from the vehicle front toward the vehicle rear.

The core idea of the invention is that, in a device for ventilating and cooling the interior of a motor vehicle with air inlet openings located in the rear in a solar cell-equipped vehicle roof and with at least one air guide channel connected to it, this air guide channel is restricted to the rear area of the vehicle roof and on the inside has at least one fan for taking in outside air and at least one cooling element for cooling the air taken in. Structural simplicity is achieved in that the bottom of the air guide channel is formed by a first section of a roof portion which extends in the direction from the vehicle rear toward the vehicle front and the top of the air guide channel is formed by a second section of a roof portion which extends in the direction from the vehicle front toward the vehicle rear.

Since the air guide channel is restricted to the rear area of the vehicle roof and the fan and a cooling element are integrated in this air guide channel, a device for ventilating and cooling is easily obtained which, on the one hand, does not reduce the height of the passenger compartment interior, and on the other, produces effective cooling of the passenger compartment interior by means of the cooling element. This cooling element can preferably be supplied with current by solar cells so that, even while the vehicle engine is off, effective cooling of the interior is possible without unnecessarily burdening the vehicle battery.

The solar cells are mounted in the second section above the air guide channel on the outside of the vehicle roof, and thus, enable a short electrical connection path between the current-generating solar cells and the current-consuming fan and the current-consuming cooling element.

Preferably, an air flow which is produced in the air guide channel runs essentially in the lengthwise direction of the motor vehicle such that, via the rear air inlet openings, outside air is taken in, this process being supported by suction action in the rear of the moving vehicle, and is blown into the interior via air outlet openings which are located on the side of the air guide channel facing the front of the vehicle. In this very short air flow path, the air flow touches the cooling element which can be made, for example, as a Peltier cooling element, in order to achieve effective cooling of the air flow. Moreover, this very simple structure of the device for ventilating and cooling the passenger compartment interior has simplification features in that formation of the bottom and top is achieved by vehicle roof portions. This obviates the necessity of additional components and walls.

The fan can be made both as an axial and also as a radial fan or any other conceivable type of fan.

In order to obtain an effective air flow for effective cooling of the interior, the air inlet openings, the air outlet openings and the air guide channel can extend across the entire width of the vehicle roof. This arrangement, moreover, acts optically advantageously both on the vehicle exterior and also on the vehicle interior. Moreover, this device can also be easily optically and functionally integrated in the rear area of a tiltable roof cover or for additional formation of a spoiler.

Other advantageous embodiments, features and advantages will become apparent from the following detailed description when considered in conjunction with the accompanying drawings.

DETAILED DESCRIPTION OF THE INVENTION

Figure 1:
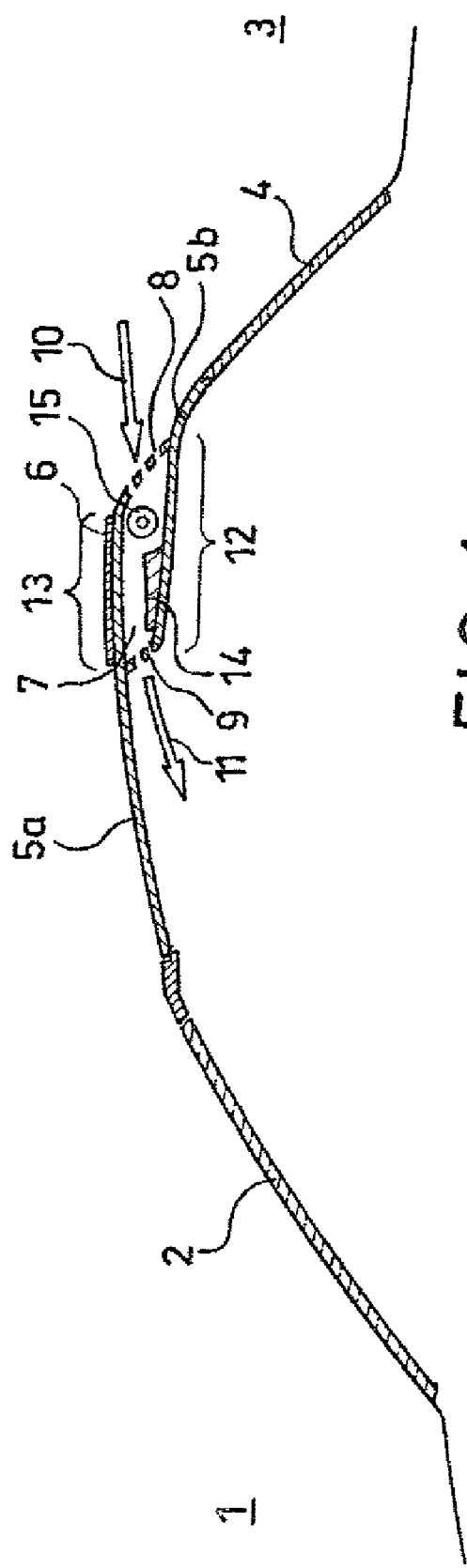
FIG. 1 is a schematic side sectional view of a motor vehicle with a device for ventilation and cooling according to an embodiment of the invention.

FIG. 1 shows a portion of a motor vehicle with a device according to an embodiment of the invention which has a windshield 2 towards the front 1 and a rear window 4 towards the back 3 of the vehicle.

A vehicle roof portion 5a extends from the vehicle front 1 in the direction toward the rear 3 of the vehicle can be made tiltable in the manner of a conventional lifting sunroof and extends from the front of the vehicle to over a vehicle roof portion 5b which runs from the rear 3 of the vehicle toward the front 1 of the vehicle so that an air guide channel 7 is formed at the rear of the vehicle roof between a first section 12 of the roof portion 5b at the bottom and a second section 13 of the roof portion 5a at the top. Preferably, the air guide channel 7 extends across the entire width of the vehicle roof The air guide channel 7 extends between air inlet openings 8 located in the rear and air outlet openings 9 facing toward the front 1 of the vehicle. The air flow defined by the air inlet and outlet openings is shown by the arrows 10, 11. Within the air guide channel 7, there is a cooling element 14, e.g., a Peltier cooling element, for cooling the air stream 10, 11 which is flowing through and a fan 15, which can be a radial or axial flow fan, for taking in outside air into the air guide channel. Solar cells 6 are located above the air guide channel 7 and can provide power to the cooling element 14 and the fan 15. This location for the solar cells 6 enables a short electrical connection path between the current-generating solar cells 6 and the current-consuming fan 15 and the current-consuming cooling element 14.

Figure 2:
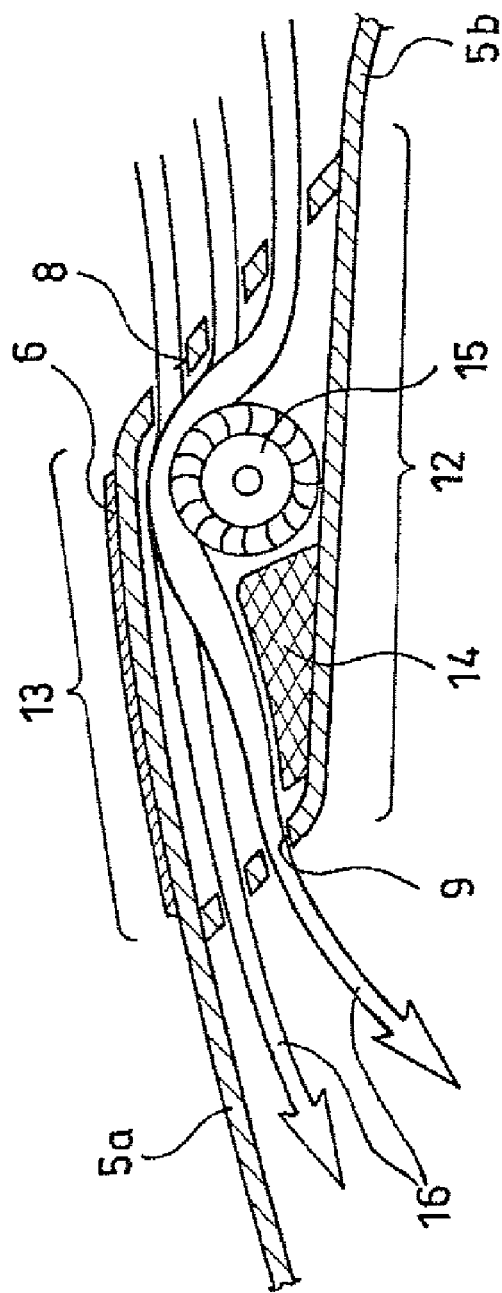
FIG. 2 is in an enlarged schematic side section view of the device for ventilation and cooling device from FIG. 1 with the air flow path illustrated.

The air flow 16 in FIG. 2 clearly shows that the fan 15 takes in the outside air via the air inlet opening 8 and routes it past the cooling element 14 by its rotary motion. In this way, the air flow is brought reliably and effectively to the desired cooling temperature, depending on to what cooling temperature the control for the cooling element has been set. In this way, even climate control of the passenger compartment interior is possible, i.e., reaching an interior temperature which is below the outside temperature.

What is claimed is:

1. Vehicle roof with an integrated device for ventilating and cooling an interior of a vehicle, comprising an air guide channel having air inlet openings located in a rear area of the vehicle roof, the air guide channel being restricted to a rear area of the vehicle roof, at least one fan within the air guide channel for taking in outside air, and solar cells on roof for supplying power to at least the at least one fan; wherein a bottom side of the air guide channel is formed by a first roof panel portion which extends from a rear end of the roof vehicle toward a front end of the roof, and wherein a top side of the air guide channel is formed by a second roof panel portion which extends from the front end of the roof toward the rear end of the roof; wherein the air guide channel extends essentially in a lengthwise direction of the roof; wherein the second roof panel portion is located overlying the first roof panel portion, wherein said air inlet openings are located at a rear end of the second roof panel portion and face in a rearward direction, and wherein air outlet openings are located at a front end of the first roof panel portion and face in a forward direction, wherein at least one cooling element is mounted in the air guide channel, and wherein the solar cells are also connected for supplying power to said at least one cooling element.

2. Device as claimed in claim 1, wherein the solar cells are mounted above the air guide channel on the outside of the second roof panel.

3. Device as claimed in claim 1, wherein the air guide channel has air outlet openings for directing air into a vehicle interior which are located at an end of the air guide channel which is directed toward the front end of the vehicle front.

4. Device as claimed in claim 1, wherein the at least one fan is an axial fan.

5. Device as claimed in claim 1, wherein the at least one fan is a radial fan.

6. Device as claimed in claim 3, wherein the air inlet openings, the air guide channel and the air outlet openings extend across the entire width of the vehicle roof.

7. Device as claimed in claim 1, wherein the at least one cooling element is a Peltier cooling element.

8. Vehicle roof with an integrated device for ventilating and cooling an interior of a vehicle, comprising an air guide channel having air inlet openings located in a rear area of the vehicle roof, the air guide channel being restricted to a rear area of the vehicle roof, at least one fan within the air guide channel for taking in outside air, and solar cells on roof for supplying power to at least the at least one fan; wherein a bottom side of the air guide channel is formed by a first roof panel portion which extends from a rear end of the roof vehicle toward a front end of the roof, and wherein a top side of the air guide channel is formed by a second roof panel portion which extends from the front end of the roof toward the rear end of the roof; wherein the air guide channel extends essentially in a lengthwise direction of the roof; wherein the second roof panel portion is located overlying the first roof panel portion, wherein said air inlet openings are located at a rear end of the second roof panel portion and face in a rearward direction, and wherein air outlet openings are located at a front end of the first roof panel portion and face in a forward direction, wherein the air guide channel has air outlet openings for directing air into a vehicle interior which are located at an end of the air guide channel which is directed toward the front end of the vehicle front, and wherein the air inlet openings, the air guide channel and the air outlet openings extend across the entire width of the vehicle roof.

9. Vehicle roof with an integrated device for ventilating and cooling an interior of a vehicle, comprising an air guide channel having air inlet openings located in a rear area of the vehicle roof, the air guide channel being restricted to a rear area of the vehicle roof, at least one fan within the air guide channel for taking in outside air, and solar cells on roof for supplying power to at least the at least one fan; wherein a bottom side of the air guide channel is formed by a first roof panel portion which extends from a rear end of the roof vehicle toward a front end of the roof, and wherein a top side of the air guide channel is formed by a second roof panel portion which extends from the front end of the roof toward the rear end of the roof; wherein the air guide channel extends essentially in a lengthwise direction of the roof; wherein the second roof panel portion is located overlying the first roof panel portion, wherein said air inlet openings are located at a rear end of the second roof panel portion and face in a rearward direction, and wherein air outlet openings are located at a front end of the first roof panel portion and face in a forward direction, wherein at least one cooling element is mounted in the air guide channel, and wherein the at least one cooling element is a Peltier cooling element.

* * * * *